(12) United States Patent
Cotey et al.

(10) Patent No.: US 7,698,009 B2
(45) Date of Patent: Apr. 13, 2010

(54) CONTROL SURFACE WITH A TOUCHSCREEN FOR EDITING SURROUND SOUND

(75) Inventors: Stan Cotey, Pacifica, CA (US); Gannon Kashiwa, Denver, CO (US); Aidan Dysart, San Francisco, CA (US)

(73) Assignee: Avid Technology, Inc., Tewksbury, MA (US)

( * ) Notice: Subject to any disclaimer, the term of this patent is extended or adjusted under 35 U.S.C. 154(b) by 841 days.

(21) Appl. No.: 11/262,144

(22) Filed: Oct. 27, 2005

(65) Prior Publication Data

US 2007/0100482 A1 May 3, 2007

(51) Int. Cl.
*G06F 17/00* (2006.01)

(52) U.S. Cl. .......................... 700/94; 381/119

(58) Field of Classification Search .................... 700/94
See application file for complete search history.

(56) References Cited

U.S. PATENT DOCUMENTS

| | | | |
|---|---|---|---|
| 3,720,005 A * | 3/1973 | Roche ...................... | 369/30.02 |
| 4,521,870 A | 6/1985 | Babbel et al. | |
| 4,670,743 A | 6/1987 | Zembe | |
| 4,677,674 A | 6/1987 | Snyder | |
| 5,127,306 A | 7/1992 | Mitsuhashi et al. | |
| 5,191,320 A | 3/1993 | MacKay | |
| 5,212,733 A | 5/1993 | DeVitt et al. | |
| 5,220,260 A | 6/1993 | Schuler | |
| 5,243,513 A | 9/1993 | Peters | |
| 5,268,964 A | 12/1993 | Watts | |
| 5,289,273 A | 2/1994 | Lang | |
| 5,293,102 A | 3/1994 | Martinson et al. | |
| 5,327,162 A | 7/1994 | Soma | |
| 5,414,337 A | 5/1995 | Schuler | |

(Continued)

FOREIGN PATENT DOCUMENTS

GB 2277239 10/1994

(Continued)

OTHER PUBLICATIONS

D&R Electronics, "Cinemix" Product Brochure, pp. 1-4.

(Continued)

*Primary Examiner*—Curtis Kuntz
*Assistant Examiner*—Paul McCord
(74) *Attorney, Agent, or Firm*—Oliver Strimpel (57) ABSTRACT

A control surface for an audio processing system that performs surround sound panning includes a touchscreen in combination with one or more other input devices. The touchscreen displays the position and movement of sound according to inputs from the various input devices or from recorded control information. An operator can input position information through the touchscreen or through one or more other input devices. The control surface may include two complete, separate panning sections. Each panning section may include the touchscreen, input devices, and switches. The touchscreen may also provide switches that change function based on the state of the other switches in the panning section. The separate panning sections can be linked together, for example to process stereo tracks. An "autoglide" operation enables an operator to move the location of a sound along a fixed path between a start location and a destination location over a time period set by the operator.

5 Claims, 4 Drawing Sheets

U.S. PATENT DOCUMENTS

| | | | |
|---|---|---|---|
| 5,443,390 A | | 8/1995 | Kokkosoulis et al. |
| 5,559,301 A | * | 9/1996 | Bryan et al. .................. 84/653 |
| 5,559,412 A | | 9/1996 | Schuler |
| 5,636,283 A | * | 6/1997 | Hill et al. ...................... 381/17 |
| 5,682,433 A | | 10/1997 | Pickard et al. |
| 5,715,318 A | | 2/1998 | Hill et al. |
| 5,812,688 A | * | 9/1998 | Gibson ...................... 381/119 |
| 6,154,549 A | * | 11/2000 | Arnold et al. ............... 381/104 |
| 6,264,355 B1 | * | 7/2001 | Ives et al. ..................... 700/85 |
| 6,327,367 B1 | * | 12/2001 | Vercoe et al. ................. 381/61 |
| 6,359,632 B1 | * | 3/2002 | Eastty et al. ................ 715/716 |
| 6,363,155 B1 | * | 3/2002 | Horbach ...................... 381/17 |
| 6,490,359 B1 | * | 12/2002 | Gibson ...................... 381/119 |
| 6,507,658 B1 | * | 1/2003 | Abel et al. .................... 381/17 |
| 6,795,560 B2 | * | 9/2004 | Hamamatsu ............... 381/119 |
| 6,798,889 B1 | * | 9/2004 | Dicker et al. ............... 381/303 |
| 6,813,530 B1 | * | 11/2004 | Ives et al. ..................... 700/94 |
| 7,039,478 B2 | * | 5/2006 | Ledoux et al. ............... 700/94 |
| 7,095,455 B2 | * | 8/2006 | Jordan et al. ............... 381/103 |
| 7,158,844 B1 | * | 1/2007 | Cancilla ...................... 700/94 |
| 2003/0174845 A1 | * | 9/2003 | Hagiwara .................... 381/17 |
| 2004/0030425 A1 | * | 2/2004 | Yeakel et al. ................ 700/94 |
| 2004/0039463 A1 | * | 2/2004 | Sucher et al. ................ 700/94 |
| 2004/0065187 A1 | * | 4/2004 | Ludwig ....................... 84/645 |
| 2005/0063550 A1 | * | 3/2005 | Koiwa ......................... 381/17 |

FOREIGN PATENT DOCUMENTS

| | | |
|---|---|---|
| GB | 2294854 | 5/1996 |
| GB | 2295072 | 5/1996 |
| WO | WO87/00331 | 1/1987 |

OTHER PUBLICATIONS

Martinson, Joe, "Flying Faders: The Untold Story", featured in Audio Horizons Fall 1999, 5 pgs.

Mathews, M.V., et al., "Groove—A Program to Compose, Store, and Edit Funtions of Time", Communications of the ACM, Scientific Applications, vol. 13, No. 12, Dec. 1970, pp. 715-721.

Menzies, Dylan, "W-Panning and O-Format, Tools for Object Spatialization", AES $22^{nd}$ International Conference on Virtual Synthetic and Entertainment Audio, pp. 1-7.

Otari, "The PicMix White Paper, a Surround Sound Primer by Michael Tapes", Jan. 1996, pp. 1-50.

Pennycook, Bruce W., "Computer-Music Interfaces: a Survey", Computing Surveys, vol. 17, No. 2, Jun. 1985, pp. 267-289.

Solid State Logic, "SL 9000 Total Studio System" Product Brochure, pp. 1-11.

Whittleton, D., et al., "A Computer Environment for Surround Sound Programming", The Institution of Electrical Engineers, No. 230, 1994, pp. 8/1-8/6.

Michael Cooper, MIX Professional Audio and Music Production, "Surround Sound Consoles", May 31, 2001, pp. 1-12.

* cited by examiner

CONTROL SURFACE WITH A TOUCHSCREEN FOR EDITING SURROUND SOUND

BACKGROUND

Multi-channel audio signals are commonly used in combination with a set of speakers arranged to create a sound field that surrounds a listener. This effect is commonly called "surround sound." Typically, the set of speakers is arranged so that there is a front center speaker, a surround left speaker, a surround right speaker, a front left speaker, a front right speaker and a subwoofer speaker. Other speaker arrangements are possible. Example formats for multi-channel audio signals for surround sound include, but are not limited to, DOLBY DIGITAL and DTS DIGITAL SURROUND.

In the production or editing of audio signals, such as the soundtrack for a motion picture, it is common to provide some mechanism to permit an editor to define the position of the sound field as perceived by a listener. In addition, it is common to provide some mechanism to permit an editor to define the motion of the sound field, i.e., to change to position of the sound field over time, as perceived by the listener. Changing the position of the sound field over time, herein called the motion of the sound, is commonly referred to as surround sound panning.

The mechanism for permitting an editor to define the position, and the change in position over time, of the sound field typically includes an input device and an output device. The input device permits the editor to specify positions and motion of the sound, whereas the output device displays to the editor the defined positions and motion. Such mechanisms are commonly provided in a control surface of an audio processing system. Such audio processing systems include, but are not limited to, audio mixers, consoles and digital audio workstations.

In the editing of multi-channel audio compositions, it is common to automate the controls applied to the audio signals. Automation is performed by recording the state of the controls over time, then "playing back" this control information. During playback, an editor may touch a control device on the control surface to modify the recorded control information. This capability of editing the recorded automation is enhanced by the use of touch sensitive or motion sensitive control devices. When a control device is touched, the recorded control information from that device is overwritten by new control information from that control device.

For surround sound panning, current control surfaces include devices such as a motorized joystick, a nonmotorized joystick combined with arrays of light emitting devices (LEDs), or one or more faders or encoders, either motorized or nonmotorized with an array of LEDs. Such devices also are commonly touch-sensitive or motion-sensitive. Motorized devices are designed to move during playback of recorded automation.

SUMMARY

A control surface for an audio processing system that performs surround sound panning includes a touchscreen in combination with one or more other input devices, such as a joystick and a rotary encoder. The touchscreen may be implemented using, for example, a color liquid crystal display (LCD) that is fitted with a transparent capacitive material. The capacitive material is activated by a finger tip or other capacitive instrument, including but not limited to an active stylus. The touchscreen displays the position and movement of sound according to inputs from the various input devices or from recorded control information. An operator can input position information through the touchscreen or through one or more other input devices, such as the joystick and/or the rotary encoder.

The control surface may include two complete, separate panning sections. Each panning section may include the touchscreen, input devices, such as a joystick and/or rotary encoder, and switches. The touchscreen may also provide switches that change function based on the state of the other switches in the panning section. The separate panning sections can be linked together, for example to process stereo tracks.

Surround panning in sound-for-picture applications often includes moving sound from one location to another over time. For example, in a motion picture, if a car passes by, or a person is walking across a room, the sound ideally would move in a similar fashion. In these cases, a sound's position has a start point and an end point. An "autoglide" operation enables an operator to move the location of a sound along a fixed path between two locations in an automatically timed fashion.

To implement the autoglide operation, the operator sets a time preference, indicative of a time period over which a movement in sound is to be made. Playback of recorded sound movements is initiated, such that during playback a sound is at an initial position at any given point in time. During the playback, the operator may provide an indication of a desired position to which the sound is to be moved, at an input time. For example the operator may touch the desired position in an X/Y grid on a touchscreen. The system then interpolates between the initial position of the sound at the input time and desired position of the sound, over the time period indicated by the set time preference. Then, during the playback, the sound can be moved over the time period from the initial position and the desired position.

DETAILED DESCRIPTION

An audio processing system, such as an audio mixer, console or digital audio workstation, permits an editor to manipulate multi-channel audio signals. The audio mixer and console typically combine a control surface with audio processing circuitry in the same housing, and may be implemented using either analog or digital circuitry or may include an embedded computer. A digital audio workstation typically includes a host computer to which a separate control surface is connected. While the description below is based on control surface for a digital audio workstation as an example implementation, other implementations for control surfaces for other audio processing systems, such as audio mixers and consoles, are possible.

Figure 1:
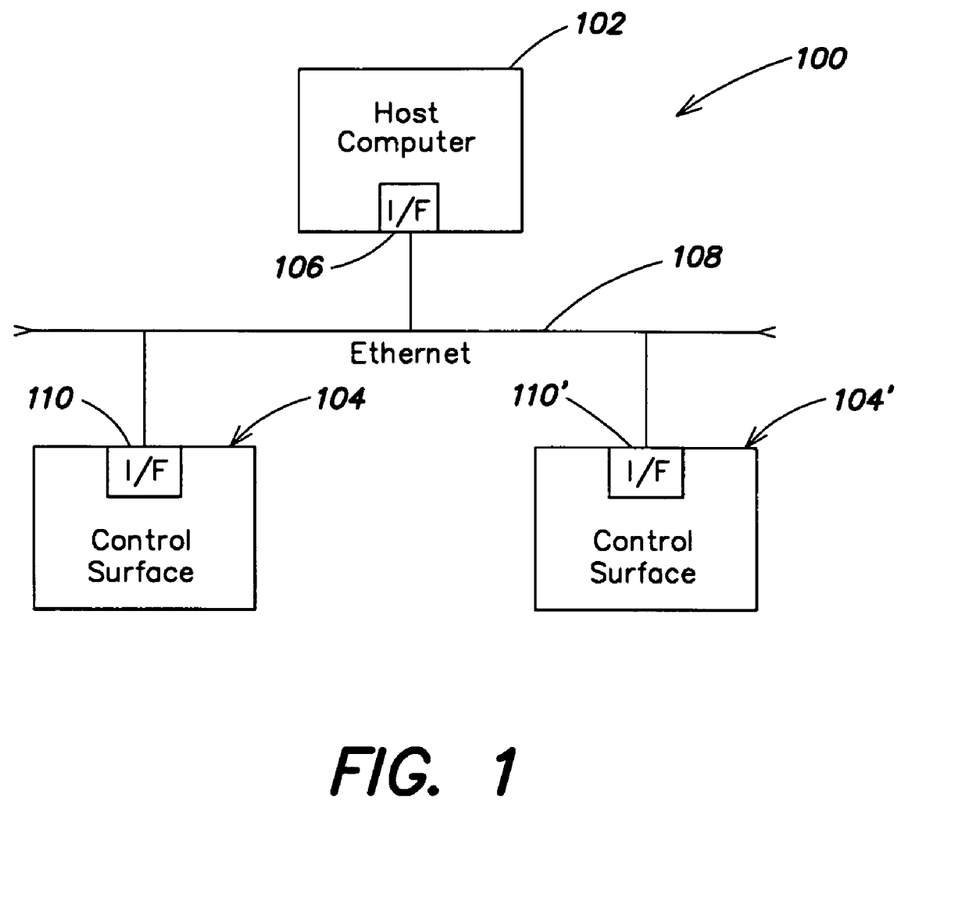
FIG. 1 is a block diagram of an example digital audio workstation.

Referring now to FIG. 1, an example digital audio workstation will now be described. This digital audio workstation 100 includes a host computer 102 and one or more control surfaces 104. The host computer 102 has an interface 106 that connects the host computer to a network 108, such as an Ethernet network. The control surface 104 also includes a network interface 110 that connects the control surface to the network 108. Other devices (not shown) also may connect to the network 108 through similar interfaces.

The host computer 102 is typically a general purpose computer running a commercially available operating system such as a WINDOWS, MACINTOSH or LINUX operating system. Software on the host computer keeps track of both data files that store multiple channels of audio data and various parameters used to combine them into a composition. The software also may direct a processor in the host computer to perform audio processing functions. The software also provides a graphical user interface to assist the musician or sound engineer to manipulate the composition. An example of such software includes the Pro Tools software from Digidesign, a division of Avid Technology, Inc.

The host computer may include peripherals for audio processing, such as peripherals that include multiple digital signal processing (DSP) chips that can perform a variety of audio processing operations under software control. The DSPs may handle so-called plug-in software as described in U.S. Pat. No. 5,842,014, hereby incorporated by reference. Such a system distributes processing tasks among one or more general purpose DSPs or other suitable processors. The distribution of tasks is performed by an intermediate level software object or "plug-in." The plug-in is designed to allocate resources of all or part of one or more DSP chips for a specific, limited set of signal processing algorithms associated with the plug-in. The DSP code running on the DSP chips is dedicated to the plug-in and is written to efficiently implement the set of algorithms associated with the plug-in. As a user of the plug-in requests a specific algorithm that is one of those algorithms among its set, the object allocates DSP resources to implement that algorithm in the most efficient way it is able. The flexibility of performing such processing is enhanced by connecting the processors in a time division multiplexed (TDM) bus structure.

The control surface 104 provides a mechanical user interface through which a musician or sound engineer manipulates the composition. Such control surfaces often include numerous mechanical control or input devices and numerous display or output devices. Information from the control devices in the control surface is periodically sent to the host computer for use in editing or playback of the composition. Information from the host computer is periodically sent to the display devices to update the displays. To provide more efficient communication between a host computer and a control surface over a network, a protocol uses packets that encapsulate messages in a binary format. Such a communication protocol that is useful for large control surfaces that require a large amount of information transfer is described in U.S. patent application Ser. No. 11/104,081, filed Apr. 12, 2005, which is hereby incorporated by reference.

In the editing of multi-channel audio compositions, it is common to automate the controls applied to the audio signals. Automation is performed by recording the state of the controls over time, then "playing back" this control information. During playback, an editor may touch a control device on the control surface to modify the recorded control information. This capability of editing the recorded automation is enhanced by the use of touch sensitive or motion sensitive control devices. When a control device is touched, the recorded control information from that device is overwritten by new control information from that control device.

Figure 2:
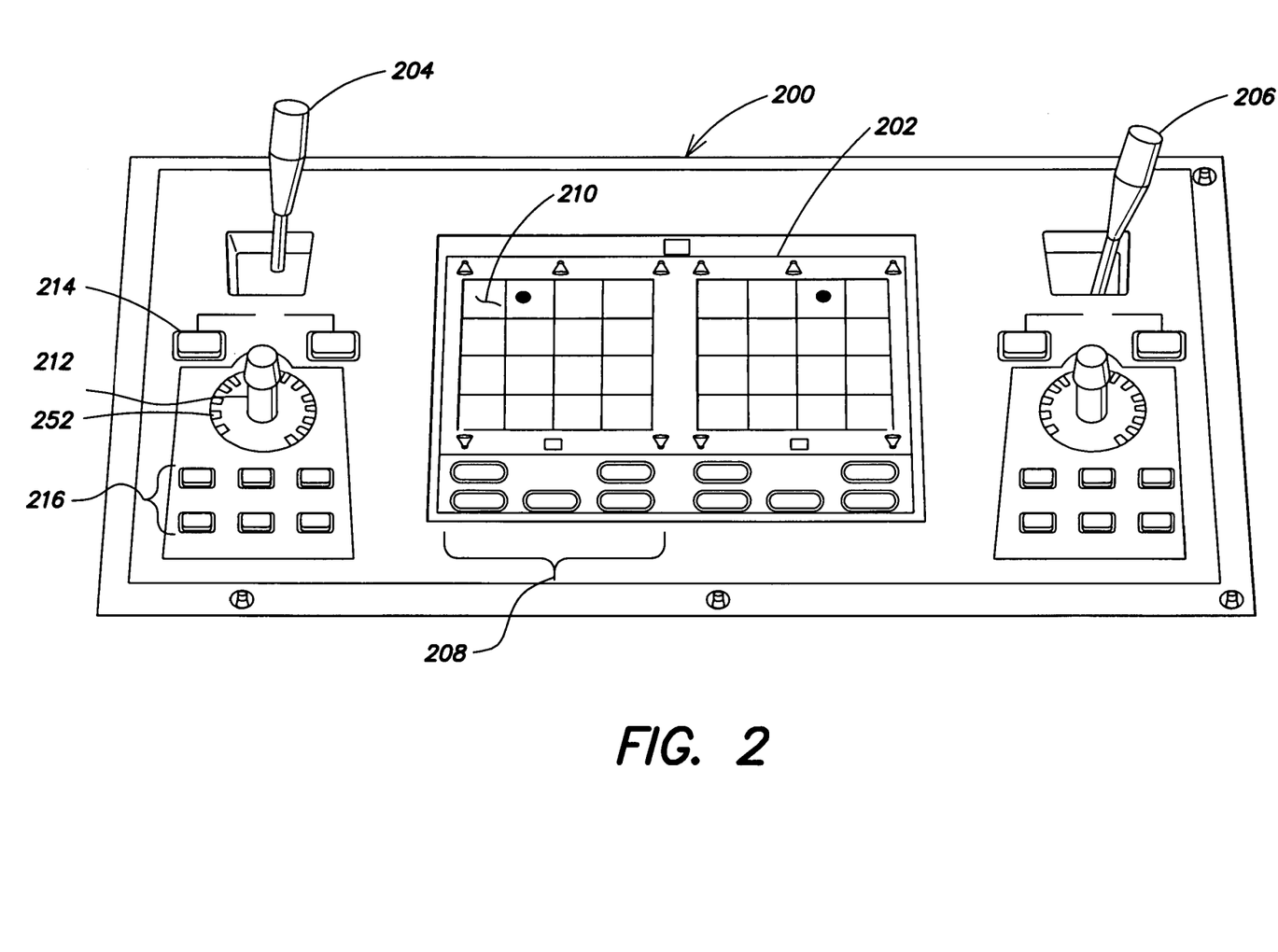
FIG. 2 is a diagram of an example control surface for surround sound panning.

Having now described the general operation of a digital audio workstation that permits editing of surround sound, an example control surface will now be described. Referring now to FIG. 2, an example control surface for surround sound panning will be described in more detail. This control surface may be a section of a much larger control surface used in the digital audio workstation. The control surface 200 of FIG. 2 provides two discrete and functionally identical panner sections. The two discrete panner sections enable control for two monaural tracks or sends, or both sides of a stereo track or send. A touchscreen 202 has two display sections, one associated with a left joystick 204, and another associated with a right joystick 206. The joysticks are preferably touch-sensitive and are used to control the panning position. The joysticks may be motorized or nonmotorized. Each touchscreen display section has a set 208 of on-screen buttons and a touch-sensitive X/Y grid 210. Each panner section also includes a hardware section including a rotary encoder 212, punch switches 214 and panner control switches 216.

The rotary encoders 212, which are preferably touch-sensitive, permit the operator to control position and divergence elements that are selected through the pan mode switches and touchscreen buttons, as described below, an to control any other control assigned to either the X-axis or the Y-axis of its associated panner section. When the operator touches the rotary encoder, the track information display temporarily switches from the parameter name to the parameter value. The rotary encoder 212 may be surrounded by a ring 252 of LEDs that are used to display the setting defined by the position of the rotary encoder. Such a rotary encoder is described in U.S. patent application Ser. No. 11/105,948, filed Apr. 14, 2005, which is hereby incorporated by reference.

The punch switches 214 permit the operator to perform punch-ins and punch-outs when writing automation using the joystick. In addition, the punch switches light whenever the pan location is being controlled by the corresponding joystick.

The panner control switches 216 provide access to position and divergence controls, pan modes, automation commands, and windows management controls for the associated digital audio workstation. Each switch may be lit when selected.

One control switch is the position switch, which permits the operator to control pan position one axis at a time with the encoder. When the position switch is lit, buttons are displayed on the touchscreen to permit the operator to choose which axis to control.

Another control switch is the divergence switch. When the divergence switch is lit, buttons are displayed on the touchscreen to permit the operator to assign front, rear, and front/rear divergence controls to the corresponding encoder.

A target control switch permits the operator to choose which outputs or automatable parameters of the focused track will be controlled by the panner. This mode can be customized to apply the panning controls to any parameter to be automated. For example, the frequency of an equalizer could be assigned to an X coordinate and the gain for that band could be assigned to the Y coordinate.

A pan mode control switch permits an operator to select which one of several panning modes is under fingertip control. For example, there may be four panning modes: X/Y mode, divergence editing, 3-knob mode, or autoglide mode. The modes of operation are described in more detail below. The mode of operation is indicated on the touchscreen display.

A window control switch permits the operator to cause display areas, or windows, to be opened and closed on the display of the host computer that is running the digital audio workstation. When the window switch is selected, the operator can open and close the on-screen output or send window for the track that is currently selected for the panner. This switch is lit when the output window for a track is open.

Finally, a lock control switch locks the currently displayed channel in the panner so that the panner does not change focus when a different channel in selected for other operations on the control surface. The lock switch is lit when the corresponding channel is locked. When a stereo track is focused in the surround panner, pressing either lock switch locks the stereo track in both panner sections.

A variety of other control and display devices may exist on a control surface, and thus the control surface described in FIG. 2 is intended to be merely illustrative. Most control surfaces include a large number of such control and display devices.

It should be understood that, in this implementation with a digital audio workstation, information from each encoder, switch, joystick and the touchscreen is communicated from the control surface 104 to the host computer 102 over the network 108. Display information that controls whether a switch is lit or that is provided to the touchscreen is generated at the host computer 102 and sent over the network to the control surface 104.

Figure 3:
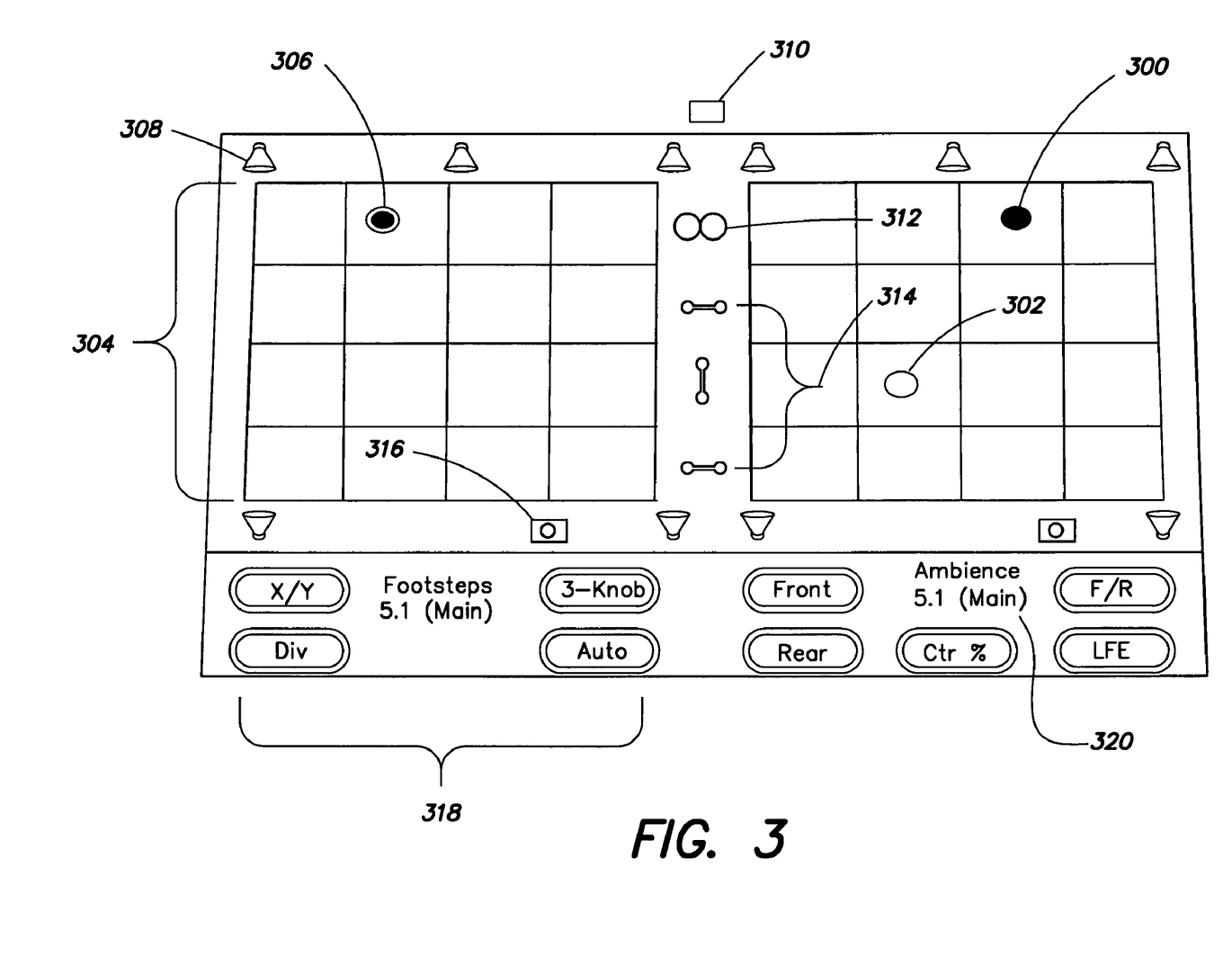
FIG. 3 is a diagram of an example touchscreen display.

An example implementation of the touchscreen display is shown in more detail in FIG. 3. The touchscreen display in FIG. 3 shows, for each panning section, an X/Y grid 304, with a pan cursor 300 and a joystick cursor 302. The X/Y grid is where multichannel panning information is input and displayed. The operator can input pan information through the touchscreen, for example using a fingertip or stylus, or through the joystick or the encoder. The pan position can be changed by the user by dragging the pan cursor 300 on the screen with a fingertip or stylus.

The pan cursor 300, which may be dot-shaped, displays the current pan position for a selected track when pan controls for that track are activated. The color of the pan cursor can be used to indicate track automation status. For example, green may indicate that the track is in automation read mode; red may indicate that the track is in automation write, touch or latch mode; yellow may indicate that the track is in automation off mode. The joystick cursor 302, which may be ring-shaped, displays the current joystick location. When the corresponding joystick is touched, the joystick cursor color may change. For example, the cursor may be gray when the joystick is untouched and white when the joystick is touched. When the joystick is controlling the pan position for a selected track, the joystick cursor and the pan cursor are locked together, as shown at 306. In addition, the corresponding punch switches will light as long as the joystick is controlling panning.

When automated panning is being played back, and the user takes over control of panning for editing using the joystick, the joystick cursor may be in a different position from the current pan position. To avoid unintentionally abrupt panning when the joystick is being moved by the operator, the position of the joystick is continually compared to the current pan position. When the joystick cursor is moved close to the pan position, the control surface allows joystick control to take over.

The display also includes speaker icons, such as shown at 308, that represent, in number and placement, the multichannel format of a selected track, also called the focused track. Touching a speaker icon snaps the pan location cursor to that speaker location. A touch indication image 310 lights whenever the touch by the operator is registered by the touch-sensitive screen. This light is particularly helpful when the fingertip of the operator completely covers an active on-screen element.

Link and inverse linking buttons 312 and 314 permit the operator to link or unlink panner sections for synchronized panning of stereo, linked panning of separate mono tracks, and mirrored automation moves in a custom mode. In the default state of the linked mode, each panner side matches the other panner's X/Y coordinates. When linked and set to inverse mode, panning moves on one panner section are inverted or reversed in the other panner section. Linking is enabled by touching the link icon. When linking is enabled, the inverse linking modes can be activated by touching the inverse linking buttons.

A panning mode icon 316 is located below the X/Y grid and permits the operator to select which one of the four panning modes is under fingertip control: X/Y mode, divergence editing, 3-knob mode, or autoglide mode. The panning mode icon may be pressed by the operator repeatedly until the desired mode icon is displayed.

Touchscreen buttons 318 can be customized depending on the panning mode to provide a variety of different controls. Example controls include, but are not limited to, controls for panner control, divergence, pan and automation. A track information display 320 shows the name of the focused track and the output destination. When the encoder knob for this panner section is touched or moved, this display shows parameter values.

The panner control switches 216 (FIG. 2) determine which touchscreen buttons are displayed. The touchscreen buttons determine the function of the encoders and the X/Y grid. As noted above, the panner control switches 216 include position, divergence, target, pan mode, window and lock switches.

When the position switch is selected, the set of touchscreen buttons allows the operator to set which parameter is controlled by the encoder. There are five position touchscreen buttons. A touchscreen button is visible only when the parameter it controls is present in the channel. The "front" button allows the encoder to control the front position of the 3-knob mode trajectory line. The "rear" button allows the encoder to control the current rear position of the 3-knob mode trajectory line. The "F/R" or front/rear button allows the encoder to control the current Y-axis position of the pan cursor on the 3-knob mode trajectory line. The "Ctr %" or Center percentage button allows the encoder to control the percentage of the signal that is routed to the center speaker. This control allows the operator to determine whether there is a discrete center image (100% Center value), a completely phantom center image (0% Center value), or a variable amount in between. As the operator reduces the Center Percentage value, the center speaker icon at the top of the X/Y grid becomes less visible. At a 0% center percentage value, the center speaker icon is completely invisible, reflecting the setting for fully phantom center. Finally, the "LFE" button allows the encoder to control the LFE (low frequency effects) level.

When the divergence switch is selected, the set of touchscreen buttons allows the operator to set the width of the panned signal with respect to neighboring speakers. Higher divergence settings produce a narrower sound source, and lower divergence settings result in a wider source signal. There are three divergence touchscreen buttons. The Front, Rear, and F/R (Front/Rear) divergence touchscreen buttons provide encoder control over front speakers, rear speakers, and between front/rear, respectively. With full (100%) divergence, tracks are panned exclusively, or discretely, to a single speaker, and are audible only in that speaker. When divergence is less than 100%, tracks are audible in neighboring speakers even when panned directly to a single speaker in the grid.

When the target switch is selected, the set of touchscreen buttons allows the operator to choose to control track panning, send panning, or a set of custom parameters mapped to the X/Y grid. The "main" button sets the panner to control panning on the main track output. The "send" button sets the panner to control send panning for sends. Pressing the send button will step sequentially through the available sends. The "custom" button sets the panner to a custom assignment mode where any two automatable parameters from the currently focused channel can be individually assigned to the X and Y axes of the panner grid. Pressing the custom button changes the touchscreen to display a set of custom assignment touchscreen buttons. An "Assign X" button allows the operator to set an automatable parameter to be controlled by X-axis movement on the panner. An "Assign Y" button allows the operator to set an automatable parameter to be controlled by Y-axis movement on the panner. A "Back" button returns the Target mode touchscreen buttons to the display. "Rotary X" and "Rotary Y" buttons allow the operator to set the encoder to adjust the parameter assigned to either the X or Y axis for finer control. An example parameter that may be assigned to a panner axis is a parameter for a plug-in executed by the digital audio workstation. To assign a plug-in parameter to a panner axis, the track that contains the plug-in parameter to be controlled is selected. The target switch on the surround panner is then pressed. The custom button is then pressed, revealing the various custom touchscreen buttons. For example, the "Assign X" or "Assign Y" button is pressed, and the encoder or fader for the parameter. The "assign" button lights, and the track information display shows the name of the assigned control when a parameter has been assigned.

When the pan mode switch is selected, the set of touchscreen buttons permits the operator to select one of the four panning modes under fingertip control: X/Y mode, divergence editing, 3-knob mode, or autoglide mode. The touchscreen buttons duplicate the functionality of the panning mode button located below the X/Y grid. In particular, in X/Y mode, the operator can pan by dragging the Pan Location cursor within the X/Y grid. In 3-knob mode, the operator can constrain panning to a straight line between specified front and rear position. The operator uses the touchscreen or encoder or other input device to specify the front and rear positions. In divergence editing mode, the operator can resize the divergence boundaries with fingertip control. In autoglide mode, the operator perform point-to-point panning from the current Pan Location cursor to a new destination over a specified time, according to a function called autoglide that is described in more detail below.

Figure 4:
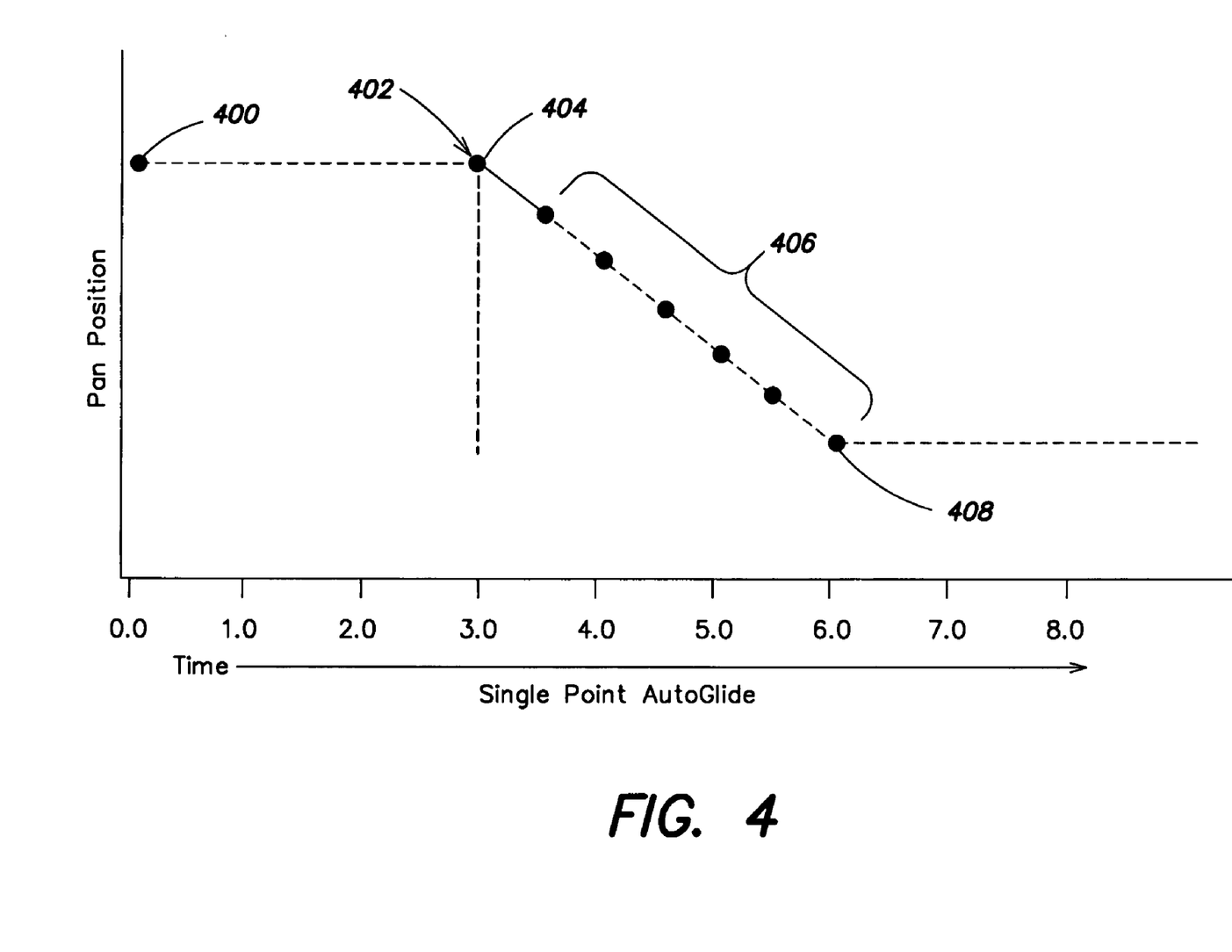
FIG. 4 is a graph illustrating an autoglide operation.

Having now described the features of the control surface, the autoglide operation will now be described in more detail in connection with FIG. 4. Surround panning in sound-for-picture applications often includes moving sound from one location to another over time. For example, in a motion picture, if a car passes by, or a person is walking across a room, the sound ideally would move in a similar fashion. In these cases, a sound's position has a start point and an end point. The autoglide operation enables an operator to move the location of a sound along a fixed path between two locations in an automatically timed fashion.

Single point autoglide is used when the transport is rolling as a real time automated pan move. It works on the assumption that the start point is known—it is the current location—and that the operator knows the desired end point. The length of time it takes to get between the points is defined by an operator controlled setting.

The end point may be stored to permit multiple glides to be executed serially. The operator could, for example, create a pan box by pressing the touch screen in the four corners and watch it travel around the box. Graphically, the autoglide function can be represented by a line between two points on the display. As time moves forward, the position moves along that line and toward the destination. The audio processing system will receive a steady stream of automation breakpoints along the trajectory as if the user had moved the position manually.

To implement the autoglide operation, the operator sets a time preference, indicative of a time period over which a movement in sound is to be made. This time preference could be set, for example, through an input text box on the digital audio workstation or through the touchscreen display. The time preference could have a preset permitted range, such as one millisecond to ten seconds. FIG. 4 provides a time line for this operation, indicating pan position over time. Playback of recorded sound movements is initiated, as indicated at 400 ("transport rolls"). The operator presses the autoglide button to initiate the autoglide operation, which prepares the system to receive the input from the operator indicating the desired end position. During the playback, when the operator provides an indication of a desired position to which the sound is to be moved, the input time is determined, as indicated at 402. For example the operator may touch the desired position on the X/Y grid on the touchscreen of FIG. 3. At that moment, an anchor breakpoint is written at the current location, as indicated at 404, and the destination is shown on the X/Y grid with a line between the two points. The system then interpolates between the initial position of the sound at the input time and desired position of the sound to generate additional breakpoints, over the time period indicated by the set time preference, as indicated at 406. In the example of FIG. 4, a time of three seconds is the set time preference. Then, during the playback, the sound can be moved over the time period from the initial position and the desired position. Automation is written as the position is moved toward the destination. When reaches the final destination is reached, as indicated at 408, the beginning and end points are retained and all intermediate points are erased by smoothing.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A control surface for facilitating surround sound editing, comprising;

a display with a touchscreen for displaying information, whereby contact by an object with the touchscreen at a position on the touchscreen over time during playback of a sound movement causes the touchscreen to provide a signal indicative of the position over time;

an input to provide, to the display, position information of the sound movement during playback of the sound movement;

wherein the display displays the received position information during the playback of the sound movement;

an input device manipulable by an operator and providing a signal indicative of a position of the input device during playback of the sound movement, wherein the display further displays the position of the input device during playback of the sound movement; and an output to send to storage the signal indicative of the position information of the sound movement from one of the object on the touchscreen and the position of the input device, during playback of the sound movement;

wherein the input receives, during playback of the sound movement, the position information based on at least one of the position of the object on the touchscreen, the position of the input device and recorded position information, wherein the input can be switched to receive the position information from the input device only if the position of the input device is close to current position information.

2. A control surface for facilitating surround sound editing, comprising:

a display with a touchscreen for displaying information, whereby contact by an object with the touchscreen at a position on the touchscreen over time during playback of a sound movement causes the touchscreen to provide a signal indicative of the position over time;

an input to provide, to the display, position information of the sound movement during playback of the sound movement;

wherein the display displays the received position information during playback of the sound movement;

an input device manipulable by an operator and providing a signal indicative of a position of the input device during playback of the sound movement, wherein the display further displays the position of the input device during playback of the sound movement; and an output to send to storage the signal indicative of the position information of the sound movement from one of the object on the touchscreen and the position of the input device, during playback of the sound movement; and wherein the input receives, during playback of the sound movement, the position information based on at least one of the position of the object on the touchscreen, the position of the input device and recorded position information.

3. The control surface of claim 1, wherein the signal from the touchscreen further comprises an indication from an operator of a desired position to which the sound is to be moved during playback of the sound movement.

4. The control surface of claim 2, wherein the signal from the touchscreen further comprises an indication from an operator of a desired position to which the sound is to be moved during playback of the sound movement.

5. The control surface of claim 2, wherein the input is switched to receive the position information from the input device if the position of the input device is sufficiently close to current position information.

* * * * *